United States Patent
Lee

(10) Patent No.: US 7,803,480 B2
(45) Date of Patent: *Sep. 28, 2010

(54) PRISMATIC LITHIUM ION RECHARGEABLE BATTERY

(75) Inventor: Jangho Lee, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 36 days.

This patent is subject to a terminal disclaimer.

(21) Appl. No.: 12/185,047

(22) Filed: Aug. 1, 2008

(65) Prior Publication Data

US 2008/0292946 A1    Nov. 27, 2008

Related U.S. Application Data

(63) Continuation of application No. 11/976,896, filed on Oct. 29, 2007.

(30) Foreign Application Priority Data

Oct. 27, 2006    (KR) .................. 10-2006-0105087

(51) Int. Cl.
*H01M 10/02* (2006.01)
*H01M 2/02* (2006.01)

(52) U.S. Cl. ................. 429/94; 429/130; 429/142; 29/623.4

(58) Field of Classification Search ............ None
See application file for complete search history.

(56) References Cited

U.S. PATENT DOCUMENTS

| 4,099,401 A | * | 7/1978 | Hug et al. ................. 72/147 |
| 4,802,275 A | * | 2/1989 | Freluche ................. 29/623.4 |
| 2006/0154138 A1 | * | 7/2006 | Miyamoto et al. ......... 429/130 |

FOREIGN PATENT DOCUMENTS

JP        2003151614      *  5/2003

(Continued)

OTHER PUBLICATIONS

JPO machine translation of JP2003151614, published May 23, 2003, retrieved Nov. 3, 2009.*

(Continued)

*Primary Examiner*—Dah-Wei D Yuan
*Assistant Examiner*—Katherine Turner
(74) *Attorney, Agent, or Firm*—Robert E. Bushnell, Esq.

(57) ABSTRACT

The provided is a prismatic lithium ion battery including an electrode assembly having a wound structure of a stack of a positive electrode, a separator, and a negative electrode. The stack has a first side edge and a second side edge, and the wound structure of the stack is formed by winding the stack around the first side edge. The wound structure of the stack has a side surface that is substantially parallel to the first side edge, and a top surface and a bottom surface, each of which is substantially perpendicular to the first side edge. A first tape is coupled to the second side edge portion of the stack of the electrode assembly, and a second tape covers the bottom surface and part of the side surface of the wound structure of the stack in a manner that the second tape does not overlap the first tape.

6 Claims, 5 Drawing Sheets

FOREIGN PATENT DOCUMENTS

| | | | |
|---|---|---|---|
| JP | 2003-187874 | | 7/2003 |
| KR | 10-2001-0027275 | | 4/2001 |
| KR | 1020010027275 A | | 4/2001 |
| KR | 1020040042375 | * | 5/2004 |
| KR | 10-2004-0107999 | | 12/2004 |
| KR | 1020040107999 A | | 12/2004 |

OTHER PUBLICATIONS

KIPO machine translation of KR1020040042375, published May 20, 2004, retrieved Nov. 3, 2009.*

KIPO machine translation of KR1020040107999, published Dec. 23, 2004, retrieved Nov. 3, 2009.*

\* cited by examiner

PRISMATIC LITHIUM ION RECHARGEABLE BATTERY

CLAIM OF PRIORITY AND CROSS-REFERENCE TO RELATED APPLICATIONS

This application is a continuation application of U.S. patent application Ser. No. 11/976,896, filed on Oct. 29, 2007, which makes reference to, incorporates the same herein, and claims all benefits accruing under 35 U.S.C. §119 from an application for PRISMATIC LITHIUM ION RECHARGEABLE BATTERY earlier filed in the Korean Intellectual Property Office on 27 Oct. 2006 and there duly assigned Ser. No. 10-2006-0105087.

BACKGROUND OF THE INVENTION

1. Field of the Invention

The present invention relates to a lithium-ion battery, and more particularly, to a prismatic lithium secondary battery having a finishing tape and a lower part tape.

2. Description of the Related Art

As the use of portable electronic devices increases, the use of the batteries for the power source is increasing. A secondary battery is expensive compared with a disposable battery, but it is economical as the battery can be reused by charging it. Therefore a secondary battery is popularly used for portable electronic devices as a power supply.

The lithium secondary battery among secondary batteries has advantages that it has a high energy capacity per unit volume or unit mass, and has longer lifespan because it has no memory effect, and has a high terminal voltage. Therefore, the lithium secondary battery is used for high end electronic devices such as notebook computers, camcorders, cellular phones and the like which requires a high mobility.

The lithium ion battery uses $LiCoO_2$ (lithium cobalt oxide), $LiNiO_2$ (lithium nickel oxide), $Li_2MnO_4$ (lithium manganese oxide), or lithium salt of an oxide of a solid solution containing at least two of cobalt, nickel and manganese, which are able to intercalate and deintercalate lithium-ion, for a positive active material. Some kinds of carbon structures, which are able to intercalate and disintercalate lithium-ion, are used for a negative active material. Each of these two electrode active materials is formed into slurry having a binder, solvent, conductive agent and slurry, and is applied to a surface of a collector to form an electrode.

A separator is interposed between two electrodes, and an electrolyte is provided as a medium through which lithium ions flows between the two electrodes. As the lithium battery has higher standard oxidation electric potential, the lithium battery operates in higher voltage. Therefore, the lithium battery requires a solution in which lithium salt is melted in the non-aqueous organic solvent for electrolyte. Aqueous electrolyte, which is containing water and generates electrolysis at voltage above 1.43 V, cannot be used as electrolyte for the lithium battery.

Because the mobility of ions in a non aqueous electrolyte is very low compared with the mobility of ions in an aqueous electrolyte, it is not easy to make the lithium battery flow a large amount of current, even though the terminal voltage of the lithium ion battery is high. In order to solve this problem, a method increasing facing areas of two electrodes can be used. In this method, electrodes in lithium ion battery can be formed in several layers and electrode layers having opposite polarities can be alternately stacked. Alternatively, the electrodes are stacked and wound to make a jelly-roll type electrode assembly.

The lithium secondary battery is classified into a can type lithium ion secondary battery, in which a case storing an electrode assembly is a metal can in a predetermined shape, and a pouch type lithium ion secondary battery, in which the case is a pouch that is thin and flexible. The can type lithium ion secondary battery is classified into a cylinder type battery, and a prismatic type battery which is proper to reduce its volume and increases portability.

Demand for small size, light-weight and high capacity has continuously increased in lithium ion battery. To meet these requirements simultaneously, it is necessary to increase the amount of the active material to increase charge capacity in a limited volume of the battery, and to reduce the volume or amount of other materials such as a separator, a coupling material (binder) and the like, which compose an electrode assembly. It is also necessary to increase an area of a surface on which an active material contacts electrolyte, which will increase the amounts of the active material and electrolyte contacting each other.

When the electrode assembly is wrapped with a finishing tape and a lower part tape to secure the electrode assembly, the finishing tape and the lower part tape do not affect the electric charging capacity of the lithium ion battery, and therefore the increased volume of the finishing tape and the lower part tape relatively decreases the volumes or amounts of materials that affect the electric charging capacity of the lithium ion battery, which results in bringing down electric charging capacity per unit volume or unit mass. Additionally, the consumption of the tape increases the manufacturing cost of the battery.

SUMMARY OF THE INVENTION

The present invention provides a solution to solve the aforementioned problems of the prismatic lithium ion battery and it is an aspect of the present invention to provide a prismatic lithium ion battery which can reduce the entire weight, thickness and volume of the electrode 6 assembly including a finishing tape and a lower part tape which are inserted into a prismatic can, and enlarge a charge capacity per unit volume or unit mass by relatively increasing the quantity of the active material injected.

Another aspect of the present invention is to provide a prismatic lithium ion battery which can easily inject an electrode assembly into a can and reduce the cost for the tape.

To accomplish the aspects of the present invention, a prismatic lithium ion battery includes an electrode assembly, a first tape, a second tape, and a prismatic can accommodating the electrode assembly. The electrode assembly includes a stack of a positive electrode, a separator, and a negative electrode. The stack has a first side edge and a second side edge, and the stack is formed into a wound stack by winding the stack around the first side edge. The wound stack has a top surface and a bottom surface, each of which is substantially perpendicular to the first side edge, and a side surface. The electrode assembly includes a positive electrode tab that is coupled to the positive electrode and a negative electrode tab that is coupled to the negative electrode. The first tape is attached on the side surface of the wound stack and covers the second side edge of the stack of the electrode assembly. The first tape is disposed in an upper half region of the side surface that is closer to the top surface than the bottom surface. The second tape covers the bottom surface and part of the side surface of the wound stack, and the second tape does not overlap the first tape.

Another aspect of the present invention provides a prismatic lithium ion battery that includes an electrode assembly, a first tape, a second tape, and a prismatic can accommodating the electrode assembly. The electrode assembly includes a stack of a positive electrode, a separator, and a negative electrode. The stack has a first side edge and a second side edge, and the stack is formed into a wound stack by winding the stack around the first side edge. The wound stack has a top surface and a bottom surface, each of which is substantially perpendicular to the first side edge, and a side surface. The electrode assembly includes a positive electrode tab that is coupled to the positive electrode and a negative electrode tab that is coupled to the negative electrode. The first tape is attached on the second side edge portion of the stack of the electrode assembly, and the first tape is disposed inside the wound stack. The second tape covers the bottom surface and part of the side surface of the wound stack, and the second tape does not overlap the first tape.

The finishing tape of the present invention may include a double-sided type tape; which is inserted into the inner surface of the winding end and the outer surface of the portion that forms the inner layer of the winding end. And the finishing tape can be installed by way of spreading one adhesive layer or a gluing layer unlike the ordinary tape which has substrate layer.

Still another aspect of the present invention provides a prismatic lithium ion battery that includes an electrode assembly, a first tape, a second tape, and a prismatic can accommodating the electrode assembly. The electrode assembly includes a stack of a positive electrode, a separator, and a negative electrode. The stack has a first side edge and a second side edge, and the stack is formed into a wound stack by winding the stack around the first side edge. The wound stack has a top surface and a bottom surface, each of which is substantially perpendicular to the first side edge, and a side surface. The electrode assembly includes a positive electrode tab that is coupled to the positive electrode and a negative electrode tab that is coupled to the negative electrode. The first tape is attached on the side surface of the wound stack and covers the second side edge of the stack of the electrode assembly. The first tape including at least two tapes separated from each other. The second tape covers the bottom surface and part of the side surface of the wound stack, and the second tape does not overlap the first tape.

Each of the at least two tapes may cover the second side edge of the stack of the electrode assembly.

Still another aspect of the present invention provides a prismatic lithium ion battery that includes an electrode assembly, a first tape, a second tape, and a prismatic can accommodating the electrode assembly. The electrode assembly includes a stack of a positive electrode, a separator, and a negative electrode. The stack has a first side edge and a second side edge, and the stack is formed into a wound stack by winding the stack around the first side edge. The wound stack has a top surface and a bottom surface, each of which is substantially perpendicular to the first side edge, and a side surface. The electrode assembly includes a positive electrode tab that is coupled to the positive electrode and a negative electrode tab that is coupled to the negative electrode. The first tape is attached on the side surface of the wound stack and covers the second side edge of the stack of the electrode assembly. The first tape is wound about the wound stack by at least a half turn. The second tape covers the bottom surface and part of the side surface of the wound stack, and the second tape does not overlap the first tape.

The finishing tape may be wound by more than one turn over the outer side surface of the electrode assembly, or may be wound the electrode assembly including the outer surface of the winding end in the short area. But, regardless how short the area on which the finishing tape is installed is, it must not overlap the lower part tape according to the attaching position thereof. In case the finishing tape is wound by ½ turn in the winding direction of the electrode assembly, if considering that the lower part tape covers most of the width portion except for the curved portion of both ends of the electrode assembly's width, the lower part tape overlaps the finishing tape regardless of its position if the finishing tape remains at the lower part of the outer surface of the electrode assembly. Therefore the present invention can be more efficient in the case of more than ½ turn of the finishing tape.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, an exemplary embodiment of the invention will be described with reference to the following drawings.

Figure 1:
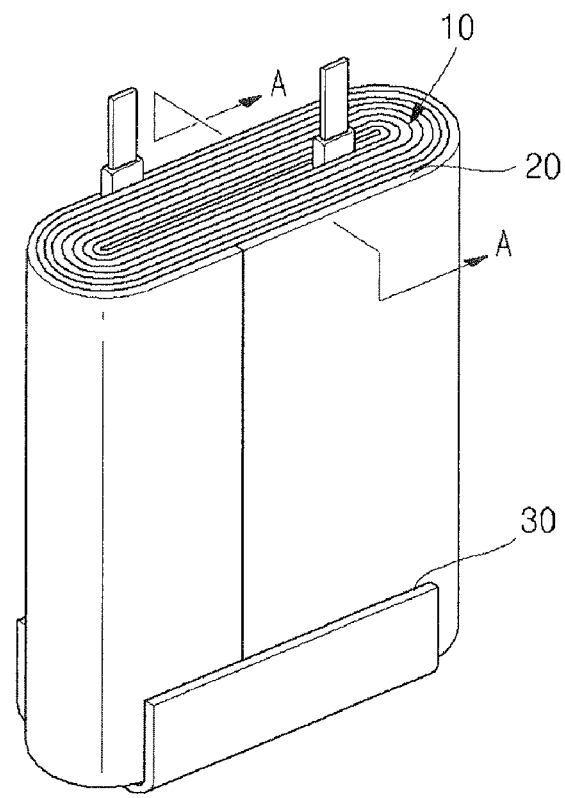
FIG. 1 is a perspective view illustrating a finishing tape and a lower part tape enclosing an electrode assembly of the conventional prismatic can type battery.

FIG. 1 is a perspective view illustrating an electrode assembly of a prismatic type lithium ion battery, and a finishing tape and a lower part tape which enclose the electrode assembly.

Figure 2:
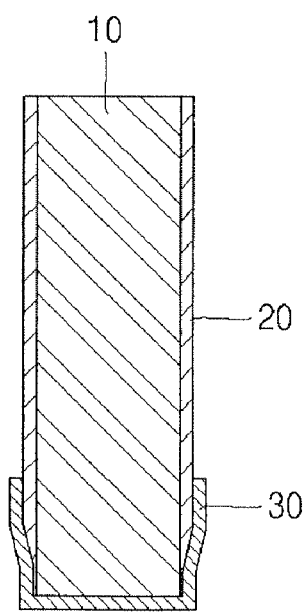
FIG. 2 is a cross-sectional view schematically illustrating a cut section along AA line of FIG. 1.

FIG. 2 is a cross-sectional view illustrating the electrode assembly cut along line AA of FIG. 1.

FIG. 1 shows an electrode assembly 10 that includes a positive electrode plate, a negative electrode plate, a separator positioned between the two electrode plates, and electrode tabs connected to each of electrode plates. As shown in FIG. 1 and FIG. 2, the finishing tape 20 is wound around the electrode assembly 10, to fasten the electrode assembly 10. However, the finishing tape 20 covers most of width of the side surface of the electrode assembly 10 from the top to the bottom of the electrode assembly 10. A lower part tape 30 covers only the lower part including the bottom surface of the electrode assembly 10.

Thus, the lower part of the electrode assembly 10 is covered with both of the finishing tape 20 and the lower part tape 30, thereby thickening as much as the thickness of those tapes. It is becoming harder for the lower part of the electrode assembly 10, which is covered with the finishing tape 20 and the lower part tape 30, to be inserted into the narrow opening of the can. As the finishing tape 20 and the lower part tape 30 are parts that do not affect the electric charging capacity of the lithium ion battery, the increased volume of the finishing tape 20 and the lower part tape 30 relatively decrease the volumes or amounts of materials that affect the electric charging capacity of the lithium ion battery, which results in bringing down electric charging capacity per unit volume or unit mass.

Figure 3:
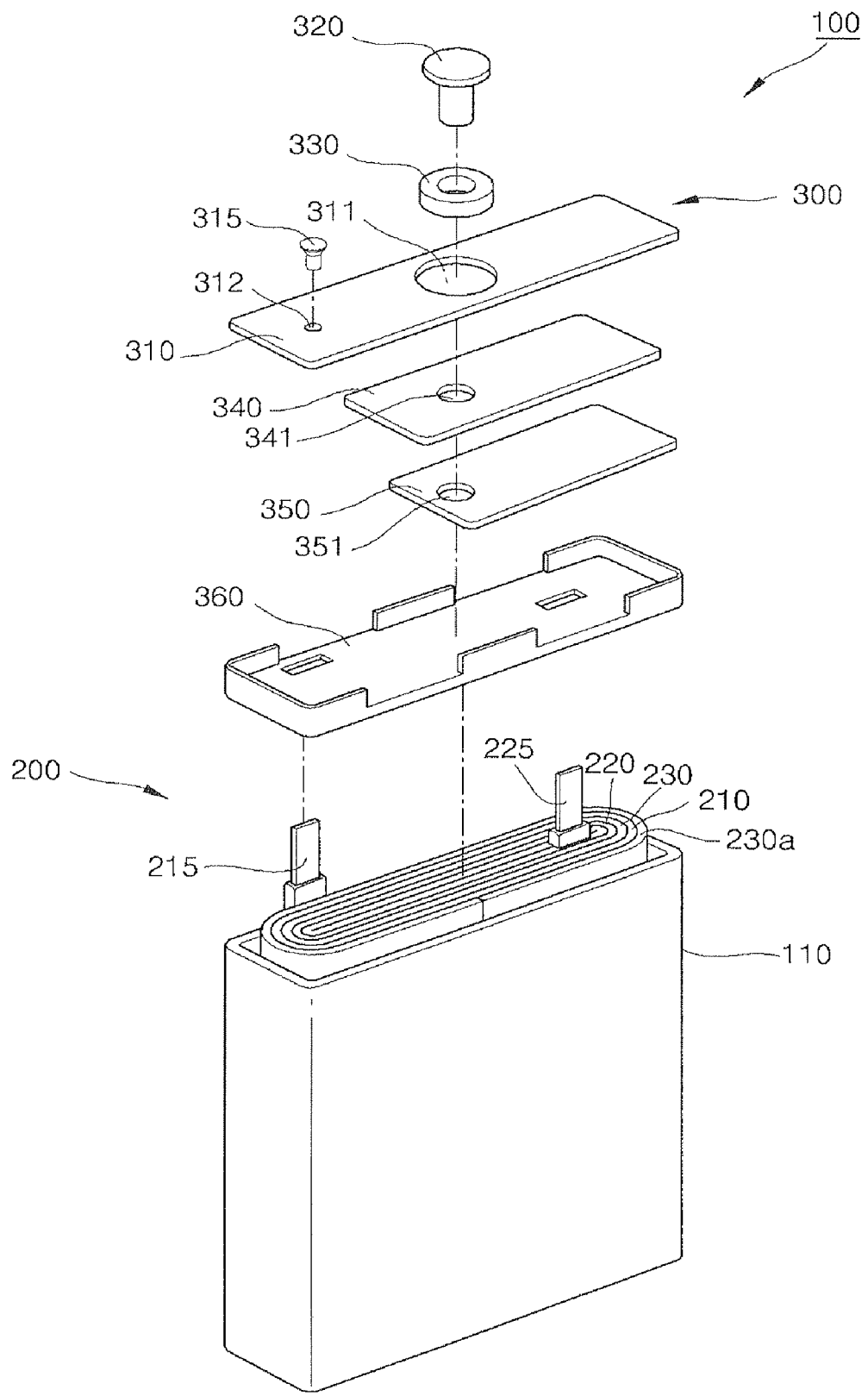
FIG. 3 is an exploded perspective view of lithium secondary battery according to an exemplary embodiment of the present invention.

FIG. 3 is an exploded perspective view of lithium secondary battery constructed as an exemplary embodiment of the present invention. As shown in the drawing, a lithium secondary battery 100 includes a can 110, an electrode assembly 200 that is formed in a jelly-roll type structure and stored in the can 110, and a cap assembly 300 coupled to the upper portion of the can 110.

The can 110 can be made of a metal material and can have a function of a terminal. The can 110 can have a cylindrical or rectangular parallelepiped shape, and has an opening on the top surface.

The electrode assembly 200 includes a positive electrode plate 210 to which a positive tab 215 is attached, a negative electrode plate 220 to which a negative tab 225 is attached, and a separator 230 interposed between the positive electrode plate 210 and the negative electrode plate 220. The electrode assembly 200 has a wound structure of the stack of the positive plate 215, separator 230, and the negative plate 225. The wound structure of the electrode assembly 200 prevents the positive electrode plate 210, the negative electrode plate 220 and the separator 230 from being separated. A finishing tape 230a enclosing the outer surface of the electrode assembly 200 is installed on the outer surface of the electrode assembly 200. Though it is not shown, the lower part tape, which encloses a lower portion and a bottom surface of the electrode assembly 200, is installed on the electrode assembly 200.

An insulation case 360 is placed on the top of the electrode assembly 200 that is inserted into the can 110, and prevents a short circuit between the electrode assembly 200 and a cap plate 310. A cap plate 310 seals the top opening of the can 110, and is coupled to one of electrode tabs 215 and 225. Another one of electrode tabs 215 and 225 is welded to the lower surface of the terminal plate 350 coupled to the electrode terminal 320 which is mounted through an electrode through hole 311 of a cap plate 310. The electrode terminal 320 is mounted on the electrode through hole 311 through a gasket 330 to insulate an electrode terminal 320, a terminal plate 350 and a cap plate 310, and insulating plate 340 can be mounted between the terminal plate 350 and the cap plate 310. Holes 341 and 351 are formed on the insulating plate 340 and the terminal plate 350, respectively, to connect the electrode terminal 320 and the terminal plate 350.

An electrolyte is supplied to the electrode assembly through an electrolyte injection hole 312 formed on the cap plate 310 after the cap plate 310 is welded to the can 110, and the electrolyte injection hole 312 is sealed by a plug 315.

Figure 4:
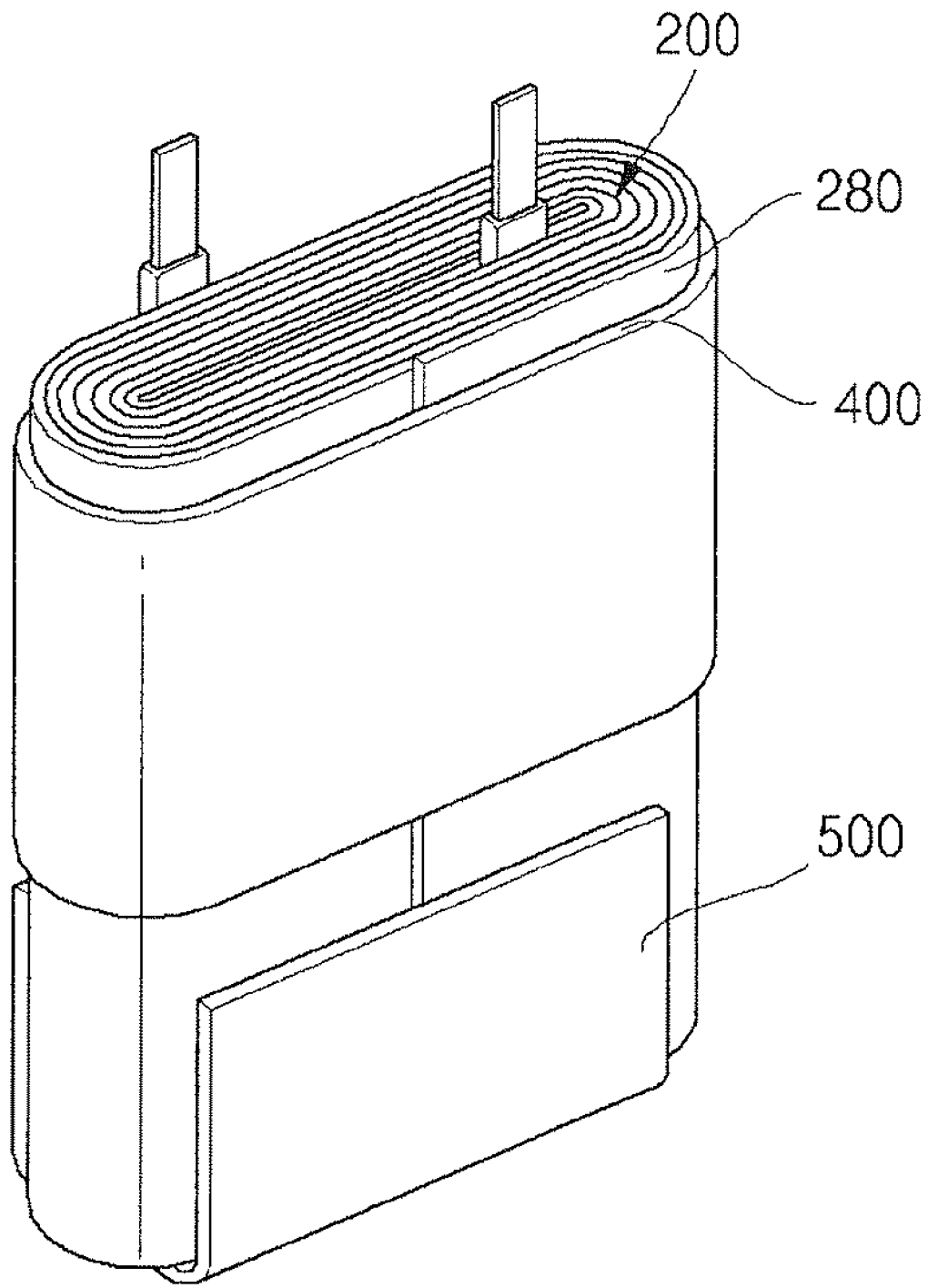
FIGS. 4, 5, and 6 are perspective views illustrating the state that the finishing tape and the lower part tape attached to the main body of the electrode assembly in other embodiments of the present invention.

FIG. 4 is a perspective view illustrating a main body of an electrode assembly on which a finishing tape (a first tape) and a lower part tape (a second tape) are attached, which is constructed as another embodiment of the present invention.

Referring to FIG. 4, an electrode assembly 200 has a wound structure of a stack of a positive electrode, a separator, and a negative electrode. The stack has a first side edge and a second side edge at an opposite side of the first side edge. The wound structure of the stack is formed by winding the stack around the first side edge. As shown in FIG. 4, the wound structure of the stack of the electrode assembly 200 has a side surface that is substantially parallel to the first side edge, and a top surface and a bottom surface, each of which is substantially perpendicular to the first side edge. Herein, a width is defined as a length of the side surface from the top surface to the bottom surface.

A finishing tape 400 wound around the side surface of the electrode assembly 200, and the lower part tape 500 is attached to enclose a part of the bottom surface and a part of the side surface. The finishing tape 400 encloses an upper half region of the side surface that is closer to the top surface than the bottom surface, and the lower part tape 500 covers about lower ⅓ region of the side surface. In the case that the lower part tape 500 covers only the bottom surface of the electrode assembly 200, the lower part tape is likely to be detached due to uneven lower side of the electrode assembly and has a difficulty to protect the electrode assembly when it is inserted into the can. Accordingly, at least a part of the lower part tape 500 may be attached to a part of the side surface of the electrode assembly 200.

Although this embodiment shows that the finishing tape winds entire side surface of the electrode assembly, the finishing tape may be formed in a narrow width to cover a part of a winding end portion 280, which is the second side edge portion of the stack of a positive electrode, a separator, and a negative electrode. Generally, it can be described that a finishing tape 400 (a first tape) is coupled to the second side edge portion of the stack of the electrode assembly 200, and a lower part tape 500 (a second tape) covers a part of the bottom surface and a part of the side surface of the wound structure of the stack in a manner that the second tape does not overlap the first tape. If the width is too narrow, the tape is likely to be detached, therefore, it is desirable to raise adhesiveness of the finishing tape or control adhesive area of the tape, and cover approximately half width in the upper and the lower direction of the electrode assembly. In addition, the first tape may cover a part of the side surface of the wound structure of the stack by winding the first tape about the first side edge of the stack by at least a half turn. Therefore, the volume of electrode assembly may be decreased relatively. That is to say, the electric charging capacity of secondary battery per unit volume may be increased remarkably.

Figure 5:
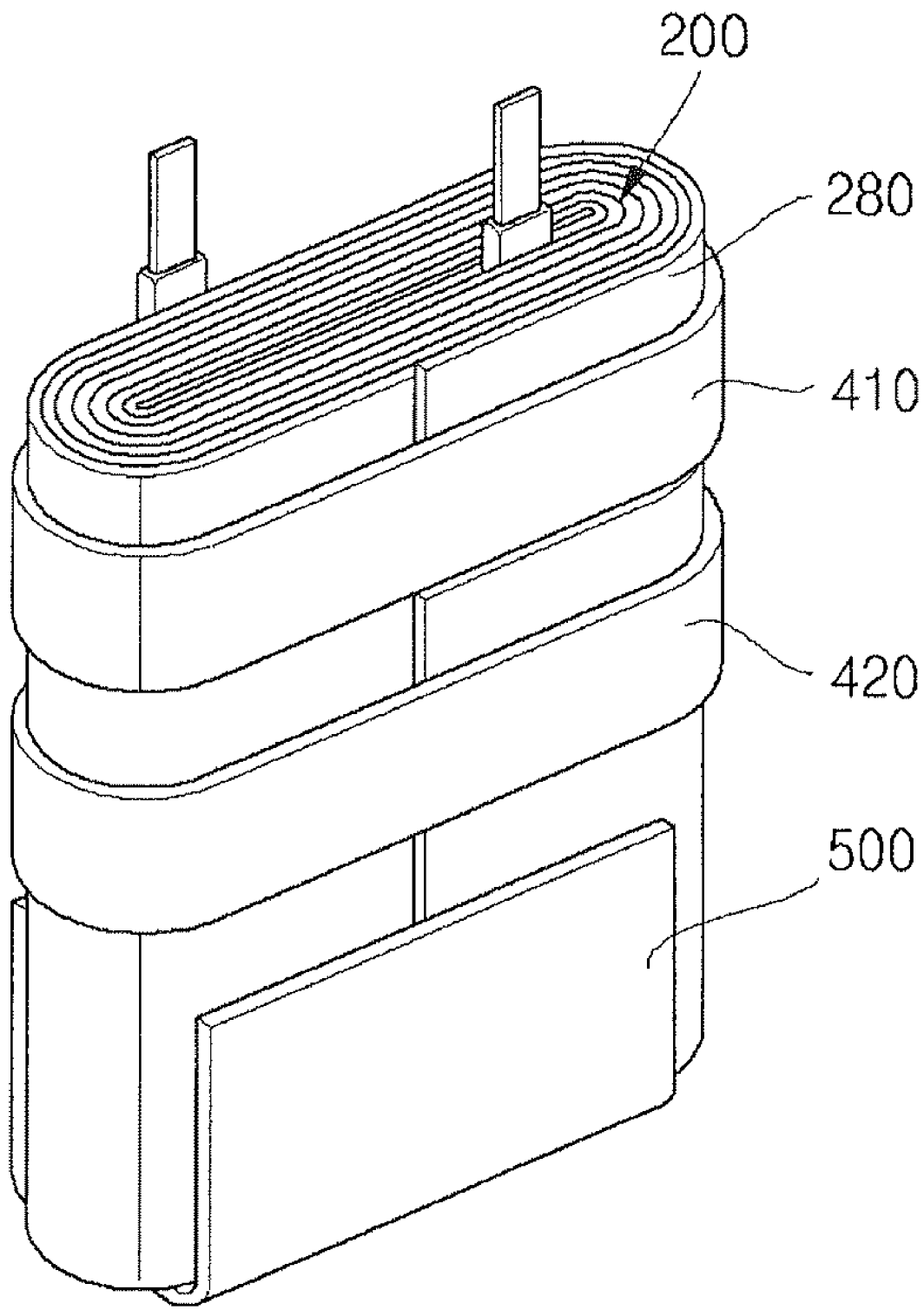

In the meanwhile, the finishing tape may be formed in a narrow band shape which winds the electrode assembly in circumferential direction. In this case, more than two finishing tapes can be used in one electrode assembly so that the finishing tape can stick the front of the winding end to the inner surface. FIG. 5 shows that two finishing tapes (a first tape and a third tape) 410 and 420 are attached at the upper part of the side surface of a electrode assembly in circumferential direction and the lower part tape 500 is attached to envelop the bottom surface of the electrode assembly.

Figure 6:
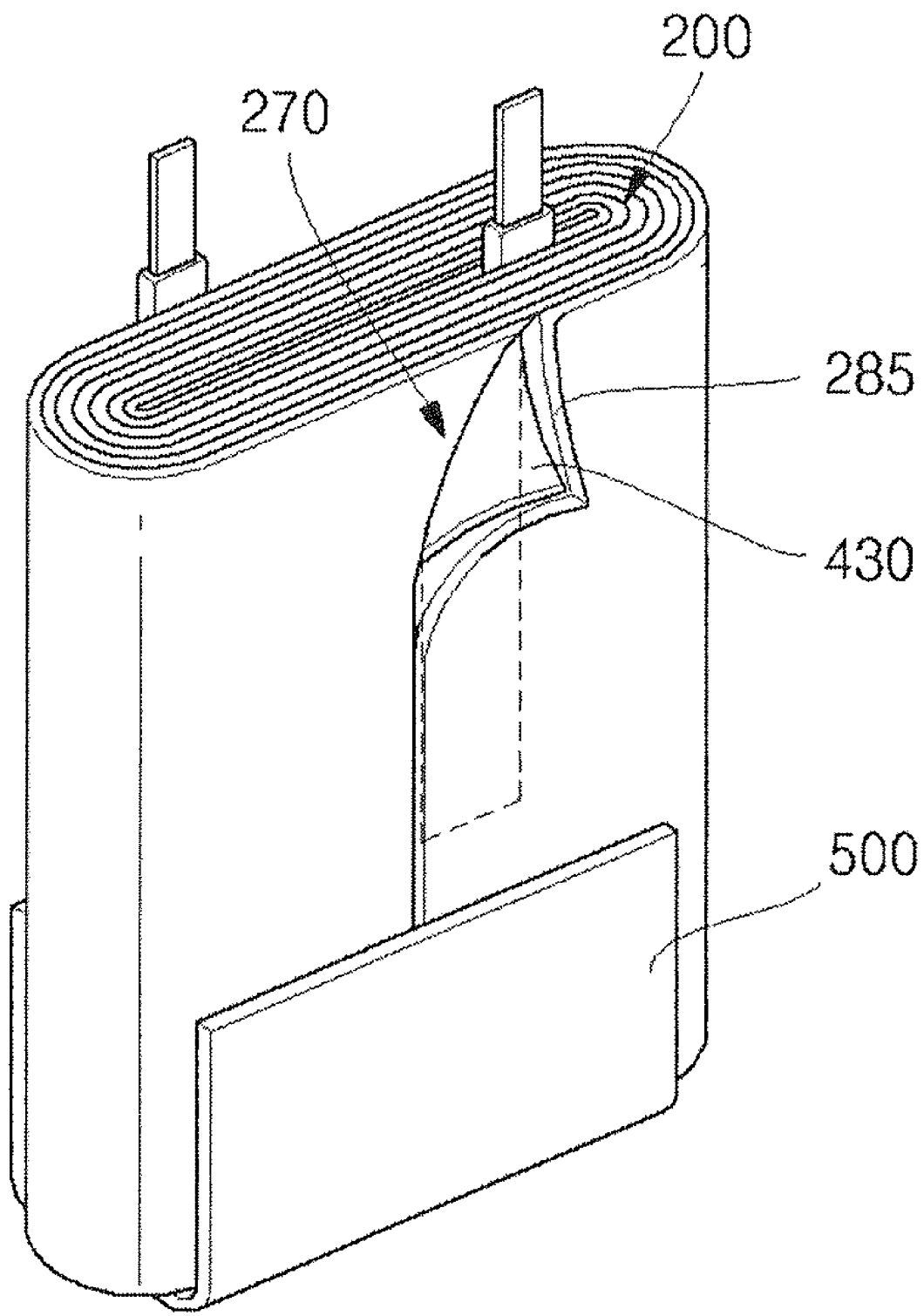

FIG. 6 shows a different embodiment of the present invention. In FIG. 6, the finishing tape 430 installed between the inner surface of the winding end 285 and the outer surface of the inner layer 270 of the winding end 285 of the electrode assembly 200. In other words, the finishing tape is formed on the second side edge portion of the stack, and the finishing tape is disposed inside the wound structure of the stack after the stack is wound about the first side edge. The finishing tape 430 is a double sided tape and may be an adhesive layer without a substrate layer. The adhesive layer type finishing tape can be installed by way of spreading one adhesive layer or a gluing layer. The lower part tape 500 is not overlapped with the finishing tape 430.

The present invention enables the entire electrode assembly to be injected into the can, and reduces the cost of the tape, and prevents the thickness of an electrode assembly from increasing due to the overlap of the finishing tape and the lower part tape. Therefore it enables the capacity per volume of the battery to relatively increase.

What is claimed is:

1. A prismatic lithium ion battery comprising:
    a winding shape electrode assembly formed by accumulating and winding two electrodes including electrode taps extended to the upper direction of the winding axis, and a separator preventing a short circuit between the two electrodes;
    a prismatic can accommodating the electrode assembly;
    a finishing tape which is attached to at least a part of the outer surface of the winding shape electrode including the winding end of the electrode assemble; and
    a lower part tape which is attached for enclosing a bottom surface of the electrode assembly and at least a part of the outer surface adjacent to the bottom surface;
    wherein the finishing tape and the lower part tape are attached to the electrode assembly in the position in which the finishing tape does not overlap the lower part tape; and
    wherein the finishing tape is installed in the upper ½ range of width in the upper and the lower direction of the outer surface of the electrode assembly.

2. A prismatic lithium ion battery comprising:
    a winding shape electrode assembly formed by accumulating and winding two electrodes including electrode taps extended to the upper direction of the winding axis, and a separator preventing a short circuit between the two electrodes;
    a prismatic can accommodating the electrode assembly;
    a finishing tape which is attached to at least a part of the outer surface of the winding shape electrode including the winding end of the electrode assemble; and
    a lower part tape which is attached for enclosing a bottom surface of the electrode assembly and at least a part of the outer surface adjacent to the bottom surface;
    wherein the finishing tape and the lower part tape are attached to the electrode assembly in the position in which the finishing tape does not overlap the lower part tape; and
    wherein the finishing tape is installed between the inner side of the winding end and the outer side of a inner layer of the winding end.

3. The prismatic lithium ion battery as claimed in claim 2, wherein the finishing tape is a double-sided tape.

4. The prismatic lithium ion battery as claimed in claim 2, wherein the finishing tape consist of adhesive material layer or gluing agent layer.

5. A prismatic lithium ion battery comprising:
    a winding shape electrode assembly formed by accumulating and winding two electrodes including electrode taps extended to the upper direction of the winding axis, and a separator preventing a short circuit between the two electrodes;
    a prismatic can accommodating the electrode assembly;
    a finishing tape which is attached to at least a part of the outer surface of the winding shape electrode including the winding end of the electrode assemble; and
    a lower part tape which is attached for enclosing a bottom surface of the electrode assembly and at least a part of the outer surface adjacent to the bottom surface;
    wherein the finishing tape and the lower part tape are attached to the electrode assembly in the position in which the finishing tape does not overlap the lower part tape; and
    wherein the finishing tape includes more than two tapes attached to the outside surface of the electrode assembly in circumferential direction.

6. A prismatic lithium ion battery comprising:
    a winding shape electrode assembly formed by accumulating and winding two electrodes including electrode taps extended to the upper direction of the winding axis, and a separator preventing a short circuit between the two electrodes;
    a prismatic can accommodating the electrode assembly;
    a finishing tape which is attached to at least a part of the outer surface of the winding shape electrode including the winding end of the electrode assemble; and
    a lower part tape which is attached for enclosing a bottom surface of the electrode assembly and at least a part of the outer surface adjacent to the bottom surface;
    wherein the finishing tape and the lower part tape are attached to the electrode assembly in the position in which the finishing tape does not overlap the lower part tape, the finishing tape being installed in the upper ½ range of width in the upper and the lower direction of the outer surface of the electrode assembly; and
    wherein the finishing tape winds the outside surface of the electrode assembly in circumferential direction at least ½ turn.

* * * * *